United States Patent

Furuhashi

[11] Patent Number: 5,961,156
[45] Date of Patent: Oct. 5, 1999

[54] PIPING STRUCTURE OF A FLEXIBLE TUBE FOR USE IN A MACHINING CENTER

[75] Inventor: Seiji Furuhashi, Aichi-ken, Japan

[73] Assignee: Ohkuma Corporation, Niwa-Gun, Aichi-Ken, Japan

[21] Appl. No.: 08/967,648

[22] Filed: Nov. 10, 1997

[30]  Foreign Application Priority Data

Nov. 11, 1996  [JP]  Japan ..................................... 8-298957

[51] Int. Cl.⁶ .............................. F16L 41/00; F16L 39/00; F16L 25/00; G05G 1/08
[52] U.S. Cl. ........................ 285/154.1; 285/320; 285/920; 74/500.5; 74/501.5 R
[58] Field of Search ................................ 174/69, DIG. 9; 191/12.4; 285/18, 154.1, 320, 920; 439/153; 248/51; 403/DIG. 4, 321, 322.3; 74/500.5, 501.5 R

[56]  References Cited

U.S. PATENT DOCUMENTS

| | | | |
|---|---|---|---|
| 3,697,928 | 10/1972 | Hammell | 285/320 X |
| 3,841,665 | 10/1974 | Capot | 285/320 X |
| 4,182,558 | 1/1980 | Matsuo | 403/DIG. 4 |
| 4,499,341 | 2/1985 | Boyd | 191/12.4 |
| 4,508,404 | 4/1985 | Frawley | 439/153 |
| 4,793,203 | 12/1988 | Staggl et al. | 248/51 X |
| 4,955,250 | 9/1990 | Fisher | 248/51 X |
| 5,590,749 | 1/1997 | Wagner et al. | 191/12.4 |

FOREIGN PATENT DOCUMENTS

| | | |
|---|---|---|
| 4-45391 | 10/1992 | Japan . |
| 7-266196 | 10/1995 | Japan . |

Primary Examiner—Anthony Knight
Assistant Examiner—Gary Grafel
Attorney, Agent, or Firm—Lahive & Cockfield, LLP

[57]  ABSTRACT

An attachment (5) is detachably mounted on the lower end of a main shaft ram (4) in such a manner that the attachment (5) can rotate about horizontal and vertical axes. The power line of a motor installed in the attachment (5) is inserted through a pair of flexible tubes (13, 25) with its ends connected to a terminal box of the attachment (5) and a terminal box (29) of the main shaft ram (4). The flexible tubes (13, 25) have a pair of connectors (15, 26) which are coupled to each other by a coupling mechanism (27) when the attachment (5) is mounted on the main shaft ram (4). A drum (30) and a rodless cylinder 32 provided above the connector (26) constitute a mechanism (36) for lifting the flexible tubes (13, 25). When the rotation of the attachment (5) about either or both of the axes causes slack in the flexible tube (13), the lifting mechanism (36) eliminate the slack bay pulling up the drum (30) and thus the flexible tube (25). The pulled-up portion of the flexible tubes (13) can be returned into the attachment (5) by lowering the drum (30).

8 Claims, 7 Drawing Sheets

PIPING STRUCTURE OF A FLEXIBLE TUBE FOR USE IN A MACHINING CENTER

BACKGROUND OF THE INVENTION

1. Field of the Invention

The present invention relates to a piping structure of a flexible tube. More particularly, the present invention relates to a structure for connecting a flexible tube to an attachment with a built-in motor rotatably coupled to the lower end of the main shaft ram for use in a machining center.

2. Description of the Related Art

Japan Published Examined Utility Model Application No. 4-45391 discloses a structure for wiring a signal line around a rotary table of a machining center. In this wiring structure, the machining center's rotary table and saddle are provided with internal and external sun gears, respectively. In addition, a plurality of bobbin-like planetary gears having a circular recess around their sides are engageably provided between the two sun gears. One end of the signal line is fastened to the rotary table with the other end fastened to the saddle. The signal line is doubled black around one of the planetary gears in such a manner that the signal line can be guided around the rotary table without slack as the planetary gears revolve due to the rotation of the table.

The above-described wiring structure, although effectively applicable to a flat cable and certain types of signal lines, has the disadvantage of requiring an extremely large planetary gear mechanism to guide a thick motor power line with a large minimum bending radius. Moreover, this wiring structure cannot be utilized with a power line inserted through a protective flexible tube laid around a rotor.

SUMMARY OF THE INVENTION

In view of the above-identified problems, an object of the present invention is to provide a novel structure for connecting a flexible tube containing a motor power line to an attachment which has a built-in motor rotatably mounted on the lower end of the main shaft ram of a machining center.

Another object of the present invention is to provide a novel structure such as can prevent slack in the flexible tube at all times.

To realize the above objects and other related objects, in accordance with the present invention, there is provided a piping structure of a flexible tube for use in a machining center. The piping structure comprises: a main shaft ram having upper and lower ends; and an attachment mounted on the lower end of the main shaft ram in such a manner as to rotate about at least one axis. The attachment has a built-in motor with a power line attached thereto. The piping structure further comprises: a pair of terminal boxes, one of the terminal which is provided adjacent to the motor with the other provided on the main shaft ram side; at least one flexible tube through which the power line of the motor is inserted, the at least one flexible tube having two distal ends connected to the terminal boxes and being wound at least partially around the at least one rotational axis of the attachment; and a lifting mechanism for pulling up tile at least one flexible tube through the main shaft rain as the attachment rotates about the at least one axis in order to eliminate the slack created in the at least one flexible tube due to the rotation of the attachment.

Although the present invention is applicable in conjunction with an attachment rotatable about a single axes, it is preferably applied in conjunction with an attachment with a universal indexing function. In this case, the attachment is mounted on the lower end of the main shaft ram in such a manner as to rotate about vertical and horizontal axes and further comprising means for guiding the at least one flexible tube about each of the vertical and horizontal axes.

According to one aspect of the present invention, the means for guiding includes first and second sets of guide members. The first set of guide members is disposed in vertical semicircle for guiding the at least one flexible tube around the horizontal axis of the rotation of the attachment while the second set of guide members is disposed in horizontal circle for guiding the at least one flexible tube around the vertical axis of the rotation of the attachment.

According to still another aspect of the present invention, the attachment is detachably mounted on the lower end of the main shaft ram and the at least one flexible tube comprises first and second flexible tubes having at proximal ends thereof a pair of connectors disengageably coupled to each other. The first flexible tube is connected at the distal end to the terminal box adjacent to the motor whereas the second flexible tube is connected at the distal end to the terminal box on the main shaft ram side. In addition, a pair of fasteners is included for fastening the connectors together in a locking position and unfastening the connectors from each other in an unlocking position and a means for driving the fasteners between the locking position and the unlocking position. In this embodiment, the attachment can be easily changed to another, desired type by an automatic changer incorporated into or provided separately from the machining center.

According to yet another aspect of the present invention, the means for driving the fasteners comprises: a pair of open-and-close members disposed parallel to the first and second flexible tubes and diametrically opposite each other across the axis of the connectors; an air cylinder, disposed orthogonally to the axis of the connectors and connected to the open-and-close members, for moving the open-and-close members between open and closed positions; and a pair of press members pivotally connected to the open-and-close members. The press members are configured in such a manner as to press the fasteners into the locking position when the open-and-close members are in the open position and to allow the fasteners to return to the unlocking position when the open-and-close members are in the closed position.

In accordance with another aspect of the present invention, the lifting mechanism is disposed at the upper end of the main shaft ram and comprises a vertically oriented rodless cylinder, a shaft connected to the rodless cylinder, and a drum supported by the shaft. In this mechanism, the at least one flexible tube is passed over the drum and the rodless cylinder is actuated to raise the drum via the shaft, thereby pulling up the at least one flexible tube.

In one practice, the piping structure further comprises a pair of rails between the means for driving the fasteners and the, lifting mechanism in the main shaft ram and a pair of sliders slidably engaging the rails and fixed to the connector of the second flexible tube.

In another practice, the terminal box on the main shaft ram side is provided above the lifting mechanism.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

An embodiment of the present invention will be explained hereinafter with specific reference to the attached drawings.

Figure 1:
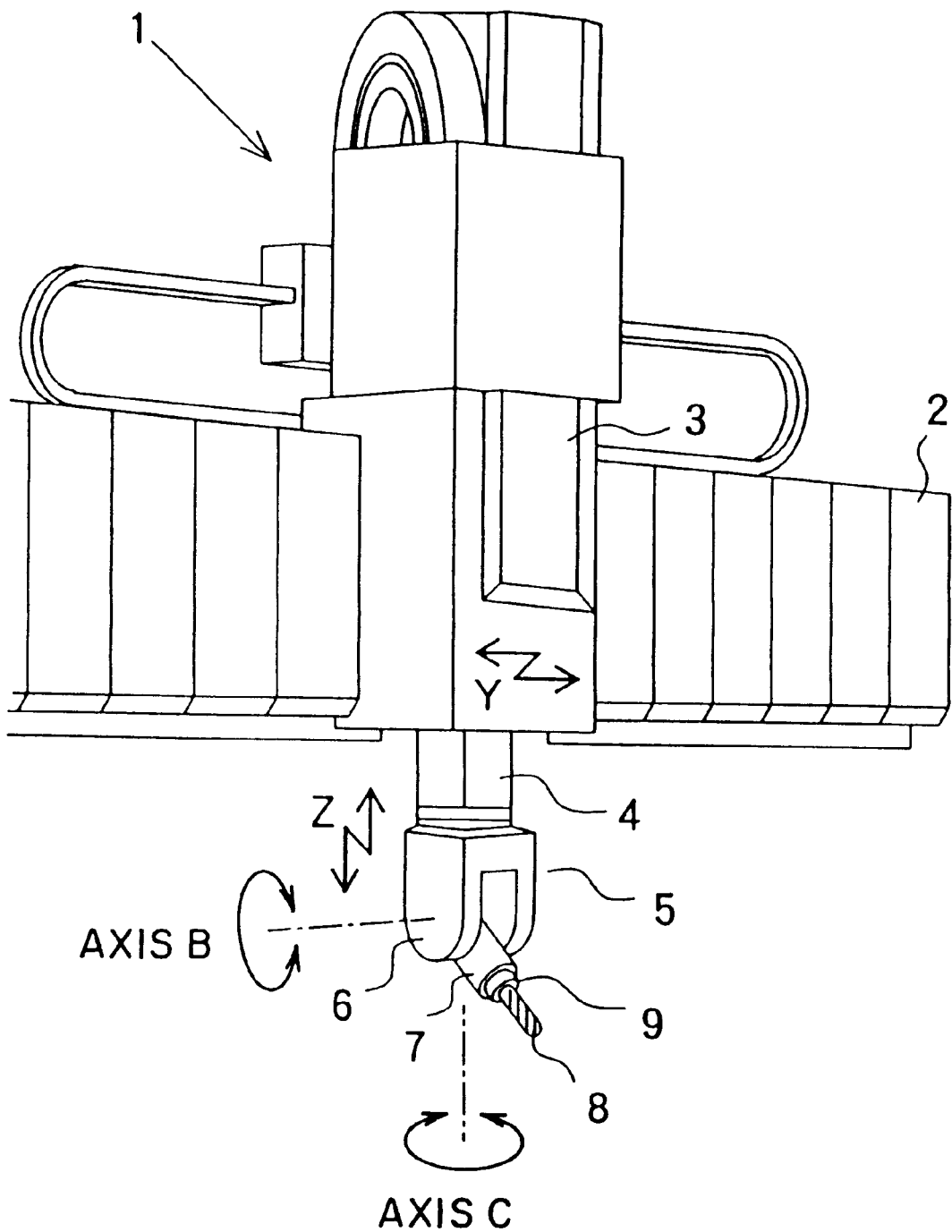
FIG. 1 shows in perspective an essential part of a machining center in accordance with the present invention.

Referring to FIG. 1, a machining center 1 includes a horizontally extending cross rail 2, a saddle 3 which is movable on the cross rail 2 along horizontal axis Y, and a main shaft ram 4 supported by the saddle 3 so as to be movable on the saddle 3 along vertical axis Z. An attachment 5 is detachably mounted on the lower end of the main shaft ram 4. The attachment 5 comprises a frame 13 that can rotate relative to the ram 4 about axis C (parallel to axis Z), and a housing 7 that can rotate relative to the frame 6 about axis B (parallel to axis Y). The housing 7 is provided with a main shaft 9 for holding a tool 8. Furthermore, the attachment 5 can locate the tool 8 in any position by rotating the tool 8 around axes B and C by means of a universal index function.

Figure 2:
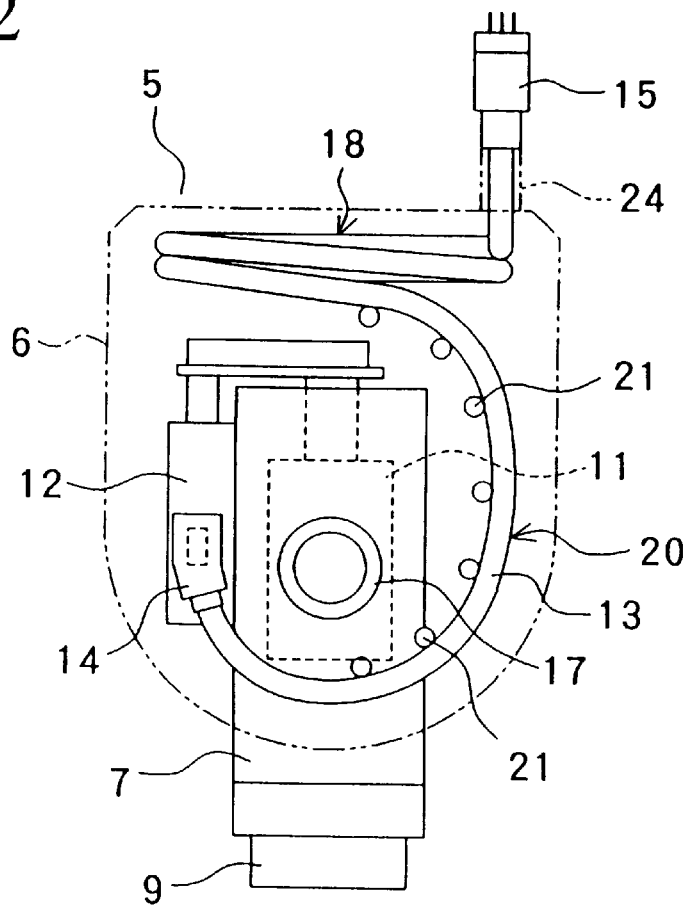
FIG. 2 is a side elevation showing the piping of a flexible tube in an attachment of the machining center shown in FIG. 1.
Figure 3:
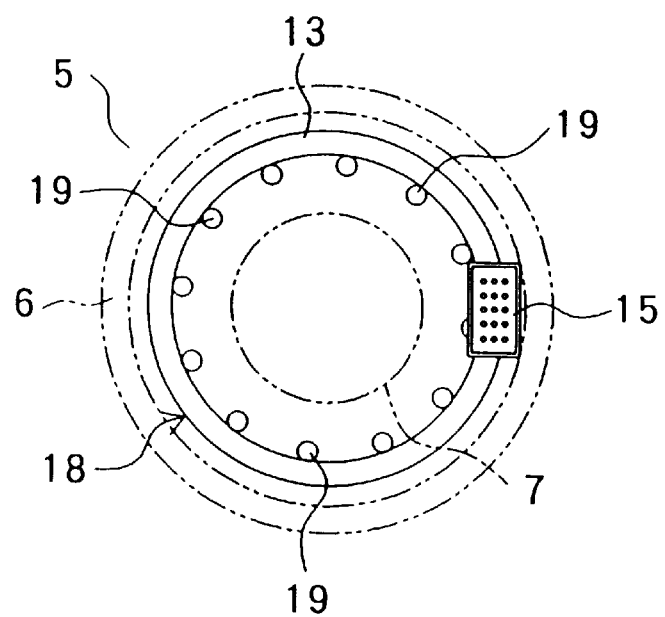
FIG. 3 is a plan view of the piping of the flexible tube of FIG. 2 with some components omitted.

Referring now to FIGS. 2 and 3, the housing 7 includes a built-in motor 11 for driving the main shaft 9 and a terminal box 12 of the motor 11, and other electrical components (not shown). The power line of the motor 11 and the electrical wires of other components are encased in a protective flexible tube 13 disposed in the frame 6. One end of the flexible tube 13 is connected to the terminal box 12 via a connector 14 while the other end is also provided with a connector 15.

To allow the housing 7 to rotate about axis B, the terminal box 12 side of the flexible tube 13 is laid around a boss 17 of the housing 7 to form a curvature 20. To allow the frame 6 to rotate about axis C, the connector 15 side of the flexible tube 13 is wound in a spiral 18 in the frame 6. Also provided in the frame 6 are a plurality of guides 21 disposed in a semicircle to guide the curvature 20 around axis B (see FIG. 2) as well as another set of guides 19 disposed in a circle to guide the spiral 18 around axis C (see FIG. 3).

Figure 4:
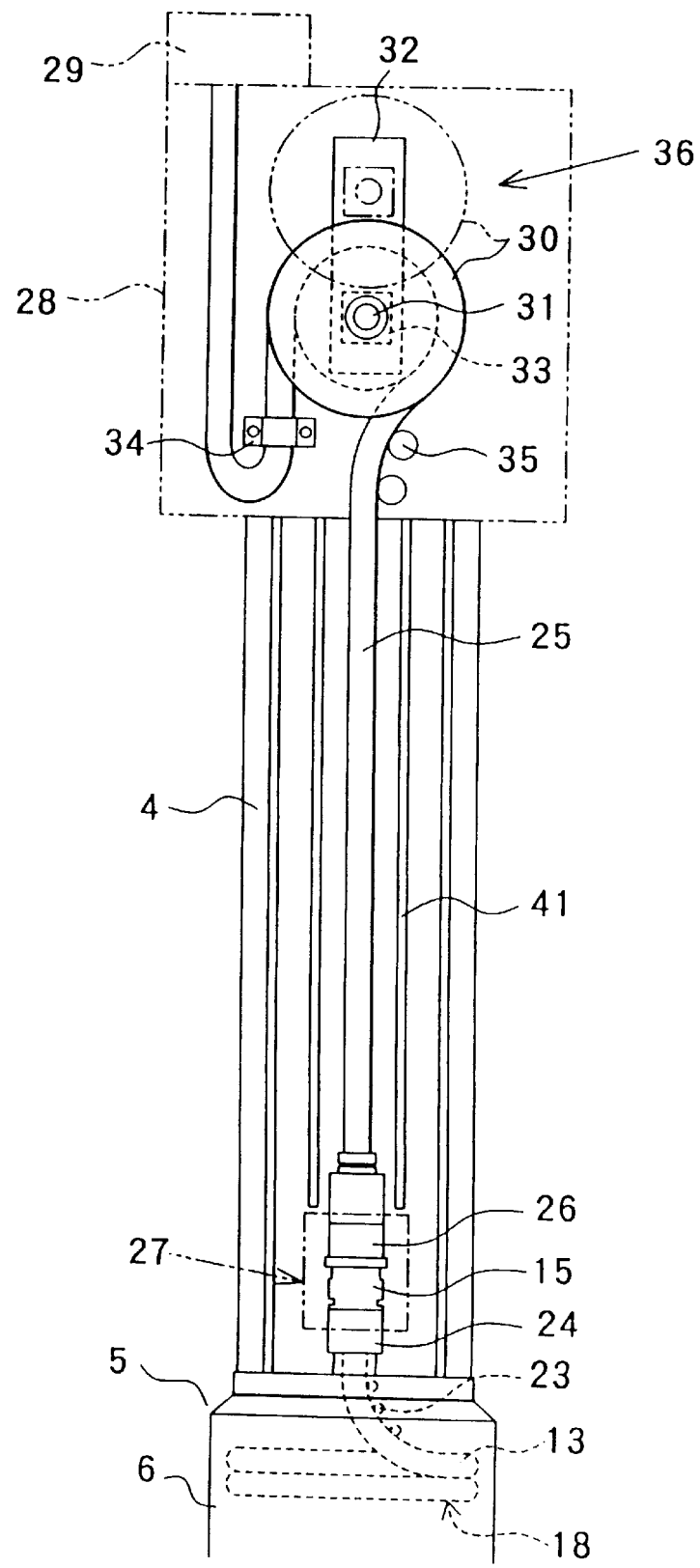
FIG. 4 is a front elevation of the piping of flexible tubes through a main shaft rain of the machining center shown in FIG. 1.

Referring now to FIG. 4, provided at the upper end of the frame 6 is yet another set of guides 23 for guiding the flexible tube 13 to the front of the lower end of the main shaft ram 4. Also provided at the upper end of the frame 6 is a support member 24 for supporting the connector 15 above the attachment 5 in an upward orientation. Inserted through the main shaft ram 4 is another flexible tube 25 containing wires identical to those in the flexible tube 13. The lower end of the flexible tube 25 is also provided with a connector 26 which can be detachably connected to the connector 15 of the flexible tube 13 to allow coupling and decoupling of the two tubes 25 and 13 as required. In FIG. 4, reference numeral 27 (representing the components inside the two-dot-and-dash box in the drawing) designates a mechanism for coupling the two connectors 26 and 15 together. The coupling mechanism is explained in further detail below.

A wiring box 28 is mounted on the upper end of the main shaft ram 4 and another terminal box 29 is provided at the top of the wiring box 28. The upper end of the flexible tube 25 is connected to the terminal box 29. The wiring box 28 contains a drum 30 which includes as its support a shaft 31 connected to a slider 33 of a rodless cylinder 32. The flexible tube 25 is passed around the upper periphery of the drum 30. The flexible tube 25 is fixed below the drum 30 between the terminal box 29 and the drum 30 by means of a band 34 while being guided by a pair of guides 35 below the drum 30 between the drum 30 and the connector 26. The drum 30 and the rodless cylinder 32 constitute a mechanism 36 for lifting the flexible tubes 13 and 25. When the rotation of the attachment 5 causes slack in the flexible tube 13, the lifting mechanism 36 eliminates the slack by lifting the drum 30, which in turn pulls up the flexible tube 25. The lifted portion of the flexible tubes 13 can be returned to the interior of the attachment 5 by lowering the drum 30.

FIGS. 5 to 8 illustrate the above-mentioned coupling mechanism 27 and its associated structures. The support member 24 of the attachment 5 has a pair of locking levers 38 pivotally attached thereto. An engagement roller 39 is provided at the upper end of each locking lever 38. The connector 26 of the flexible tube 25 has a pair of sliders 40 secured thereto. The sliders 40 have rollers 42 slidably engaged with rails 41 of the main shaft ram 4 and a pair of fasteners 43 for coupling the connectors 15 and 26 together.

Figure 6:
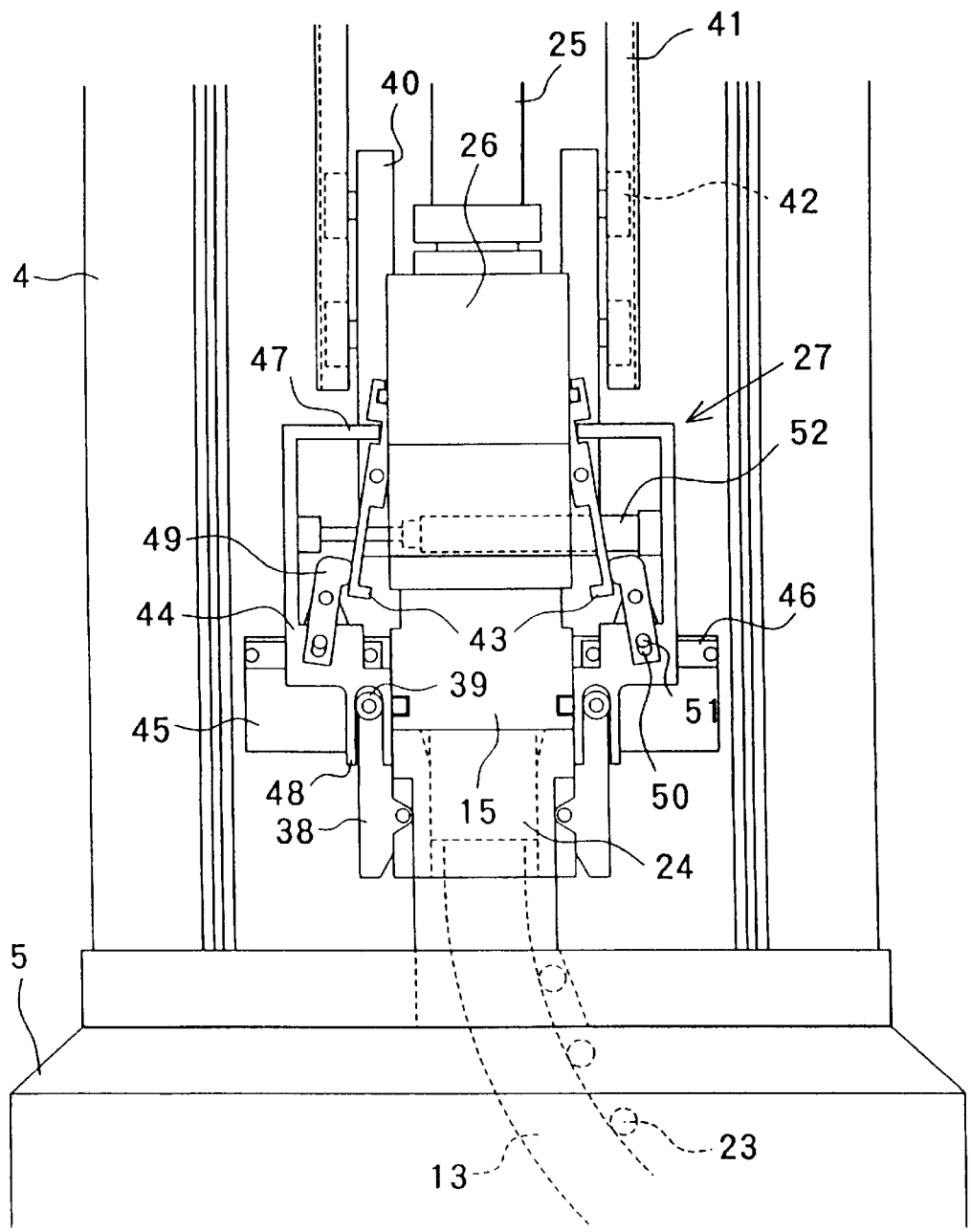
FIG. 6 is a front elevation of the inside the main shaft ram and the top portion of the attachment, showing the coupling mechanism of FIG. 5 when the attachment is mounted ton the main shaft ram.
Figure 7:
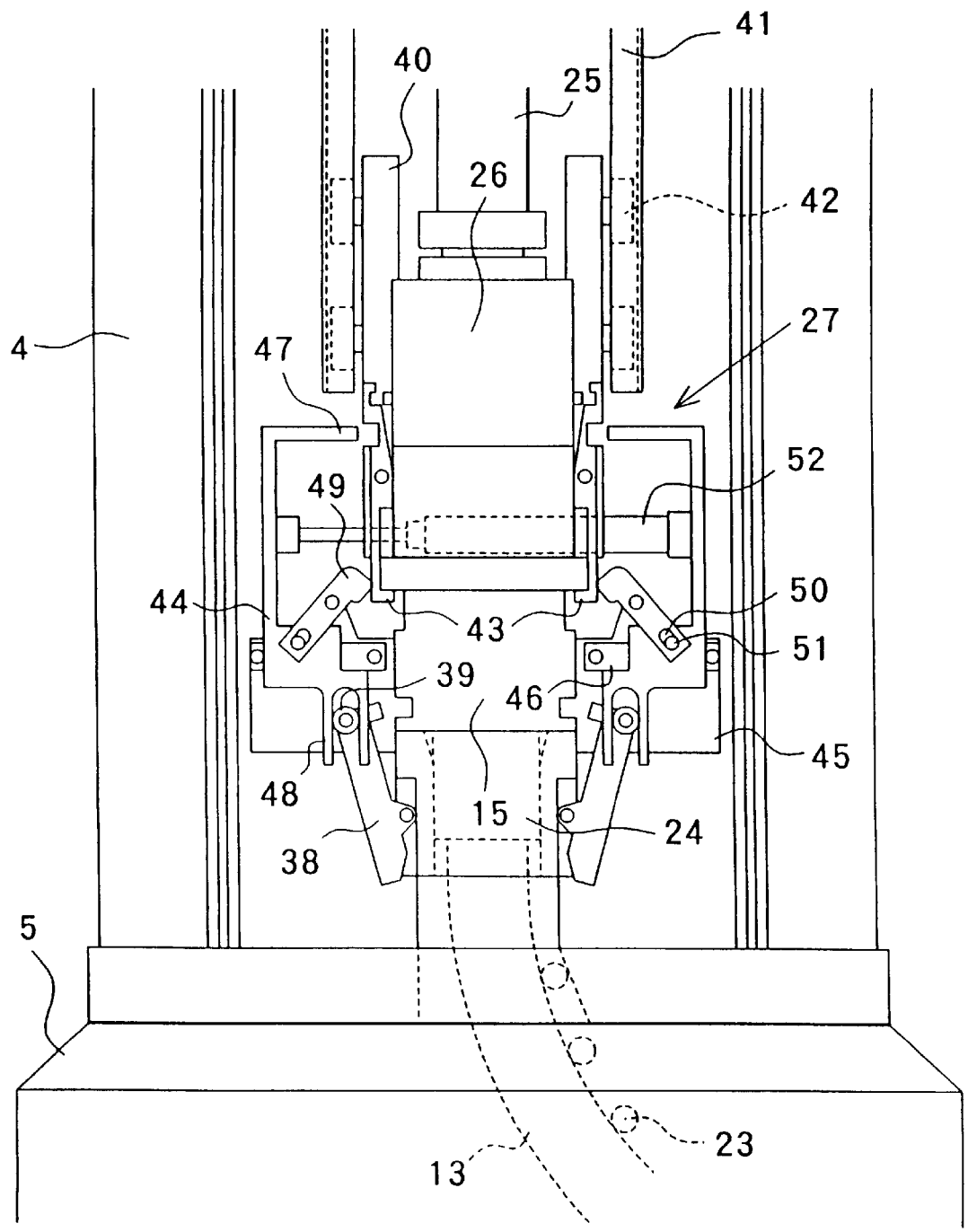
FIG. 7 is a front elevation of the inside the main shaft ram and the top portion of the attachment, showing the coupling mechanism of FIG. 5 when the connectors are fastened to each other.

Fixed to the main shaft ram 4 is a bracket 45 on which a pair of open-and-close members 44 is supported via a pair of rails 46. Each of the open-and-close members 44 has an engagement portion 47 for engaging tho upper portion of one of the fasteners 43 and a U-shaped portion 48 for engaging one of the rollers 39. Moreover, a pair of press levers 49 are pivotally attached to the bracket 45 with the upper ends of the press levers engaging the lower ends of the fasteners 43. Each of the press levers 49 is connected to the respective open-and-close member 44 via a slot 50 formed near its lower end and a pill 51 connected to the open-and-close member 44. Furthermore, an air cylinder 52 is interposed in between the two open-and-close members 44. The air cylinder 52, the open-and-close members 44, and the press levers 49 constitute a mechanism for driving the fasteners 43 between a locking position as shown in FIG. 7 and an unlocking position as shown in FIG. 6.

In the operation of the piping structure thus constructed, the attachment 5 is connected to and detached from the lower end of the main shaft ram 4 by an automatic changer provided in the machining center 1.

Figure 5:
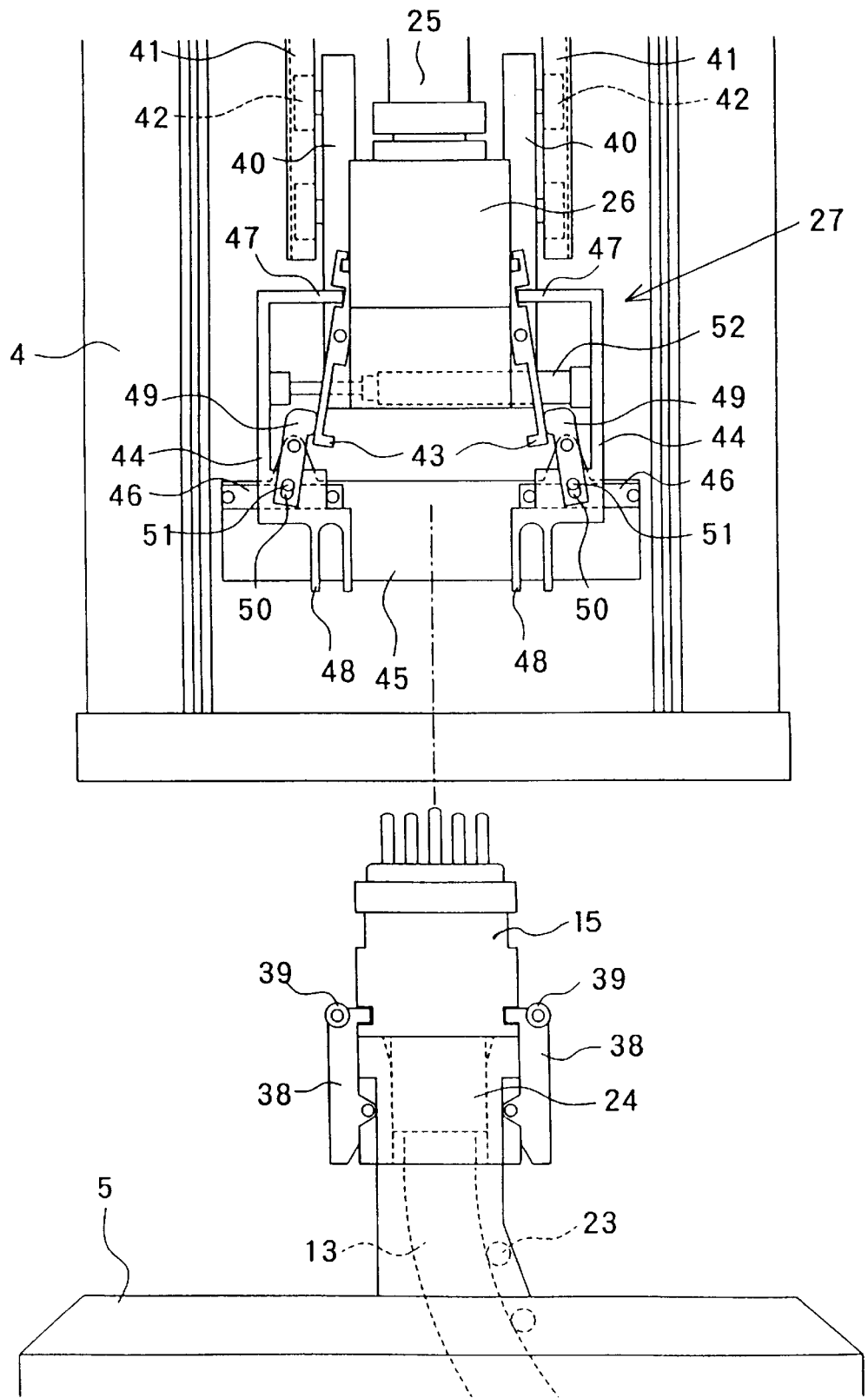
FIG. 5 is a front elevation of the inside the main shaft ram and the top portion of the attachment, showing a coupling mechanism before the attachment is mounted on the main shaft ram of the machining center shown in FIG. 1.

As shown in FIG. 5, before the attachment 5 is connected to the main shaft ram 4, the connector 15 is fitted in the support member 24 and fastened by the locking levers 38 to the support member 24. Meanwhile, in the main shaft ram 4, the air cylinder 52 is retracted with the open-and-close members 44 in the closed position, the press levers 49 in the open position, and the fasteners 48 in the unlocking position.

Additionally, as the engagement portions 47 of the open-and-close members 44 inwardly bias the upper halves of the fasteners 43, the connector 26 is fixed to the bracket 45 by means of the fasteners 43. Meanwhile, sufficient clearance is provided below the connector 26 for the introduction of the connector 15 of the attachment 5

As shown in FIG. 6, when the attachment 5 is connected to the main shaft ram 4, the two connectors 15 and 26 are also automatically coupled to each other, with the engagement rollers 39 of the locking levers 38 fitted in the U-shaped portions 48 of the open-and-close members 44. As shown in FIG. 7, when the air cylinder 52 is extended in this situation, the open-and-close members 44 are moved to all open position to close the press levers 49, thus placing the fasteners 43 in the locking position, in which position the two connectors 15 and 26 are fastened together. In addition, the locking levers 38 moves outward with the U-shaped portions 48 so as to release the connector 15, whereupon the connector 15 is no longer fastened to the support member 24.

Figure 8:
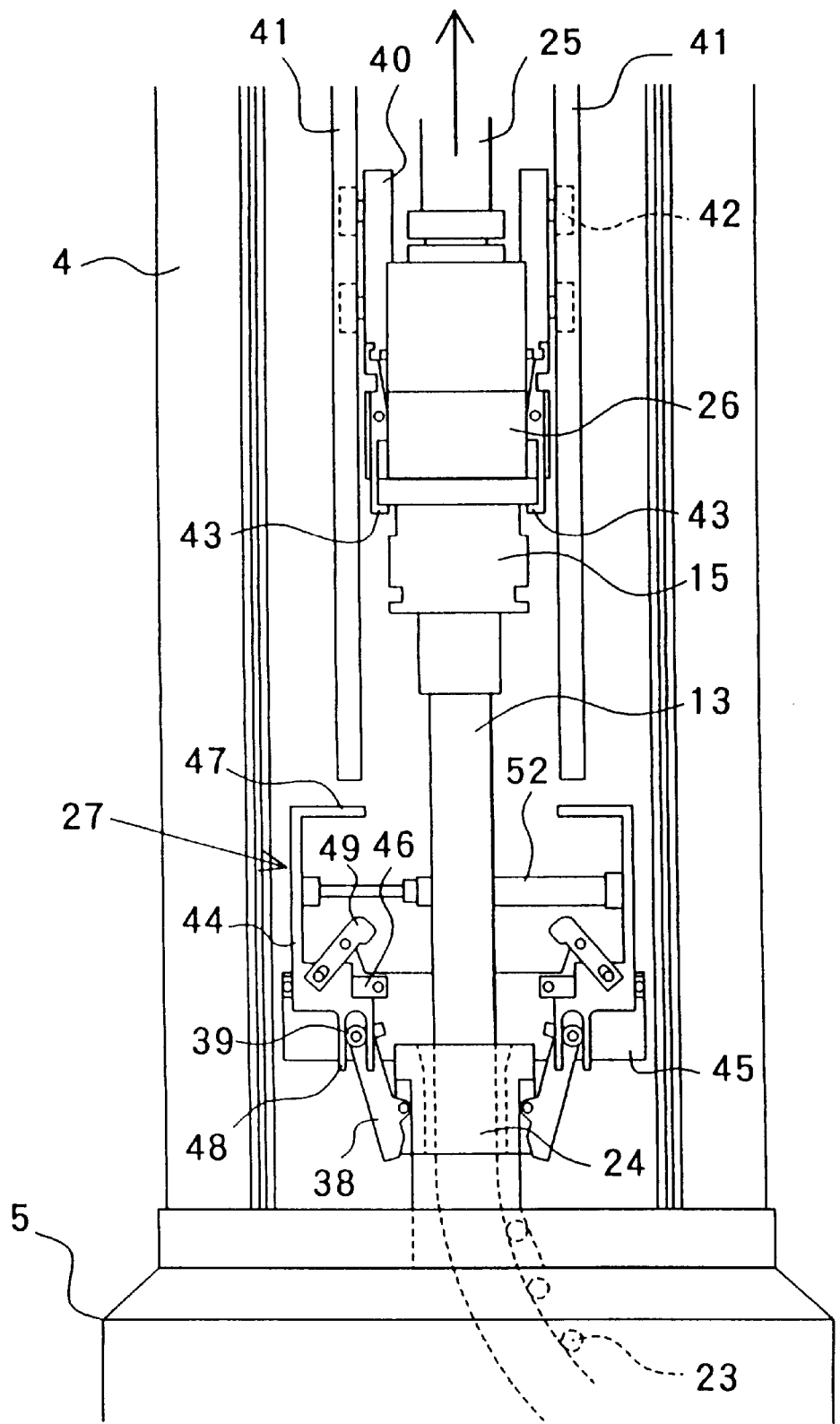
FIG. 8 is a partially enlarged front elevation of FIG. 4, showing the flexible tubes pulled up with the two connectors fastened to each other.

When the attachment 5 is rotated about axis B or C during machining, the rodless cylinder 32 is driven to raise the drum 30 a distance corresponding to the rotation angle of the attachment 5. As shown in FIG. 8, this results in elimination of the slack in the flexible tube 13 by pulling up the flexible tube 25 and the connector 26 of the main shaft ram 4, and the connector 15 and the flexible tube 13 of the attachment 5 along the rails 41 as they are all connected into one tubular assembly. In accordance with this arrangement, the flexible tube 13 remains free of slack in the attachment 5 even when the attachment 5 is rotated by a large angle. Conversely, when the attachment 5 is restored to its previous position, the rodless cylinder 32 lowers the drum 30 to return the retracted portion of the flexible tube 13 from the main shaft ram to the interior of the attachment 5 4.

To disconnect the attachment 5 from the main shaft ram 4, the air cylinder 52 is retracted with the connector 15 fastened to the support member 24. In this way, the coupling mechanism 27 operates in reverse of the above-explained coupling operation, thus unfastening the connector 15 from the connector 26. At the same time, the locking levers 38 are closed, thereby coupling the connector 15 and the support member 24 again, so that the attachment 5 can be removed from the main shaft ram 4.

As explained above, according to the present invention, the flexible tube is laid around and wound in spiral about the rotational axes of the attachment so that the slack in the flexible tube can be pulled up through the main shaft ram As the attachment rotates about these axes. This structure offers the advantage of allowing the flexible tube to be installed in a relatively small space in a slack-free condition at all times.

As also described above, the upper end of the flexible tube 25 is directly connected to the terminal box 29 at the top of the wiring box 28. However, a connector may be interposed between the flexible cube 25 and the terminal box 29 to connect these two components.

As any number of further modifications, alterations, and changes are possible without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A piping structure of flexible tubing for use in a machining center, the piping structure comprising:

a main shaft ram having upper and lower ends;

an attachment mounted on the lower end of the main shaft ram in such a manner as to rotate about at least one axis, the attachment having a built-in motor with a power line attached thereto;

a pair of terminal boxes, one of the terminal boxes being provided adjacent to the motor and the other being provided on the main shaft ram side;

at least one flexible tube through which the power line of the motor is inserted, the at least one flexible tube having two distal ends connected to the terminal boxes and being wound at least partially around the at least one rotational axis of the attachment; and a lifting mechanism for pulling up the at least one flexible tube through the main shaft ram as the attachment rotates about the at least one axis in order to eliminate the slack created in the at least one flexible tube due to the rotation of the attachment.

2. A piping structure in accordance with claim 1, wherein the attachment is mounted on the lower end of the main shaft ram in such a manner as to rotate about vertical and horizontal axes and further comprising means for guiding the at least one flexible tube about each of the vertical and horizontal axes.

3. A piping structure in accordance with claim 2, wherein the means for guiding includes first and second sets of guide members, the first set of guide members being disposed in vertical semicircle for guiding the at least one flexible tube around the horizontal axis of the rotation of the attachment and the second set of guide members being disposed in horizontal circle for guiding the at least one flexible tube around the vertical axis of the rotation of the attachment.

4. A piping structure in accordance with claim 1, wherein the attachment is detachably mounted on the lower end of the main shaft ram and the at least one flexible tube comprises first and second flexible tubes having at proximal ends thereof a pair of connectors disengageably coupled to each other, the first flexible tube being connected at the distal end to the terminal box adjacent to the motor and the second flexible tube being connected at the distal end to the terminal box on the main shaft ram side, and further comprising a pair of fasteners for fastening the connectors together in a locking position and unfastening the connectors from each other in an unlocking position and a means for driving the fasteners between the locking position and the unlocking position.

5. A piping structure in accordance with claim 4, wherein the means for driving the fasteners comprises:

a pair of open-and-close members disposed parallel to the first and second flexible tubes and diametrically opposite each other across the axis of the connectors;

an air cylinder, disposed orthogonally to the axis of the connectors and connected to the open-and-close members, for moving the open-and-close members between open and closed positions; and a pair of press members pivotally connected to the open-and-close members, the press members being configured in such a manner as to press the fasteners into the locking position when the open-and-close members are in the open position and to allow the fasteners to return to the unlocking position when the open-and-close members are in the closed position.

6. A piping structure in accordance with claim 1, wherein the lifting mechanism is disposed at the upper end of the main shaft ram and comprises a vertically oriented rodless cylinder, a shaft connected to the rodless cylinder, and a drum supported by the shaft, in which the at least one flexible tube is passed over the drum and the rodless cylinder is actuated to raise the drum via the shaft, thereby pulling up the at least one flexible tube.

7. A piping structure in accordance with claim 5 further comprising a pair of rails between the means for driving the fasteners and the lifting mechanism in the main shaft ram and a pair of sliders slidably engaging the rails and fixed to the connector of the second fixed tube.

8. A piping structure in accordance with claim 6, wherein the terminal box on the main shaft ram side is provided above the lifting mechanism.

* * * * *